United States Patent [19]

Baughman

[11] Patent Number: 5,005,850
[45] Date of Patent: Apr. 9, 1991

[54] RETRACTABLE STAIRS FOR VEHICLES

[76] Inventor: Milo Baughman, 24 S. 600 East, #5, Salt Lake City, Utah 84102

[21] Appl. No.: 459,013

[22] Filed: Dec. 29, 1989

[51] Int. Cl.$^5$ .............................................. B60R 3/00
[52] U.S. Cl. ...................................... 280/166; 182/127
[58] Field of Search ............ 280/163, 165, 166, 164.1; 182/90, 91, 97, 92, 95, 96, 127; 296/62

[56] References Cited

U.S. PATENT DOCUMENTS

| | | | |
|---|---|---|---|
| 3,462,170 | 5/1967 | Smith et al. | 280/166 |
| 4,249,683 | 2/1981 | Park | 182/93 |
| 4,623,160 | 11/1986 | Trudell | 280/166 |

FOREIGN PATENT DOCUMENTS 1383843 11/1964 France ................................. 280/166

Primary Examiner—Andres Kashnikow
Assistant Examiner—Richard Camby
Attorney, Agent, or Firm—Lynn G. Foster

[57] ABSTRACT

A novel extendable-retractable stairs apparatus which provides stairwise access to the top of a vehicle. The apparatus mounts to the exterior of a vehicle and retracts into a self-contained package for travel. When unpacked for use, one part of the package cover rotates downward to become the bottom step. The stairs extend upward, parallel the side of the vehicle on which the apparatus is mounted. The top stair attaches to a support affixed to the vehicle for stability. Grab bars can be mounted to the vehicle to assist the user to maintain balance while using the stairs.

15 Claims, 4 Drawing Sheets

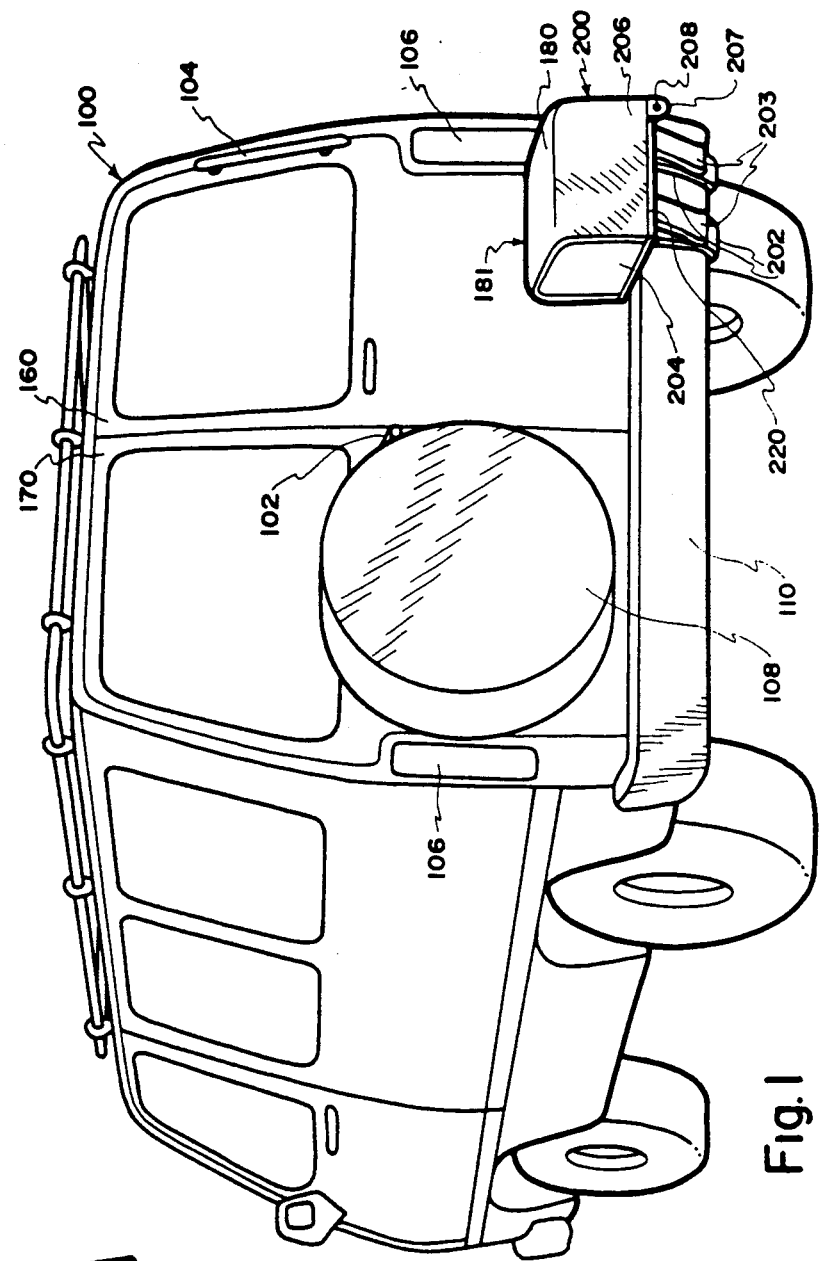
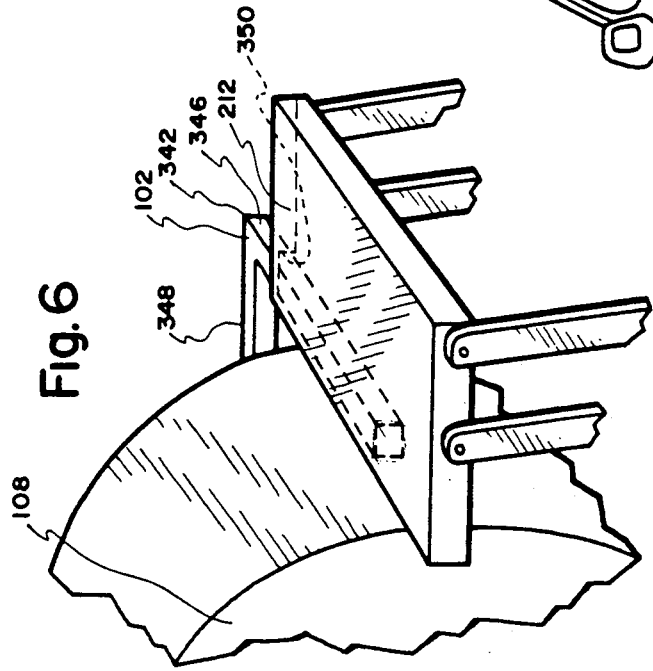

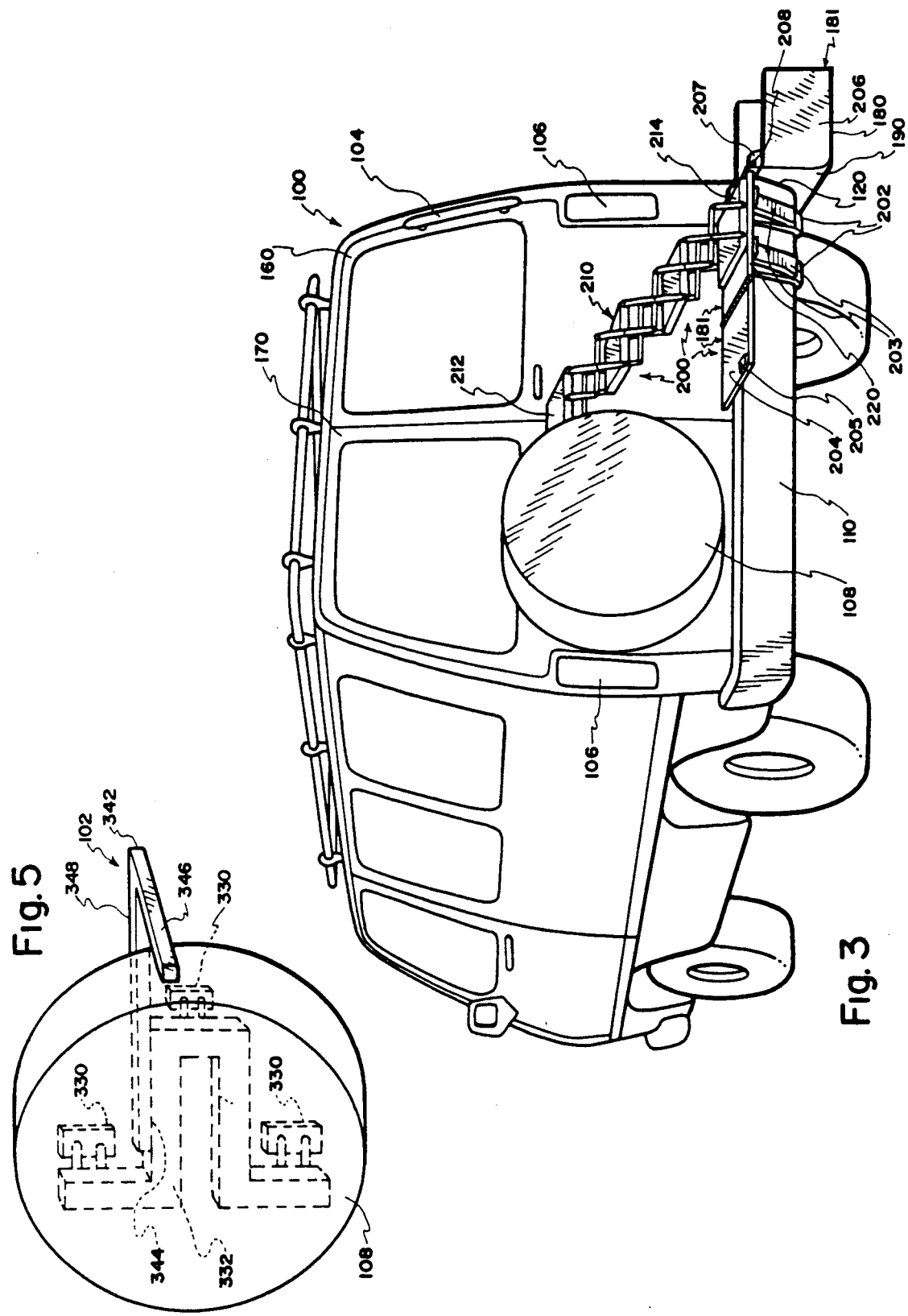

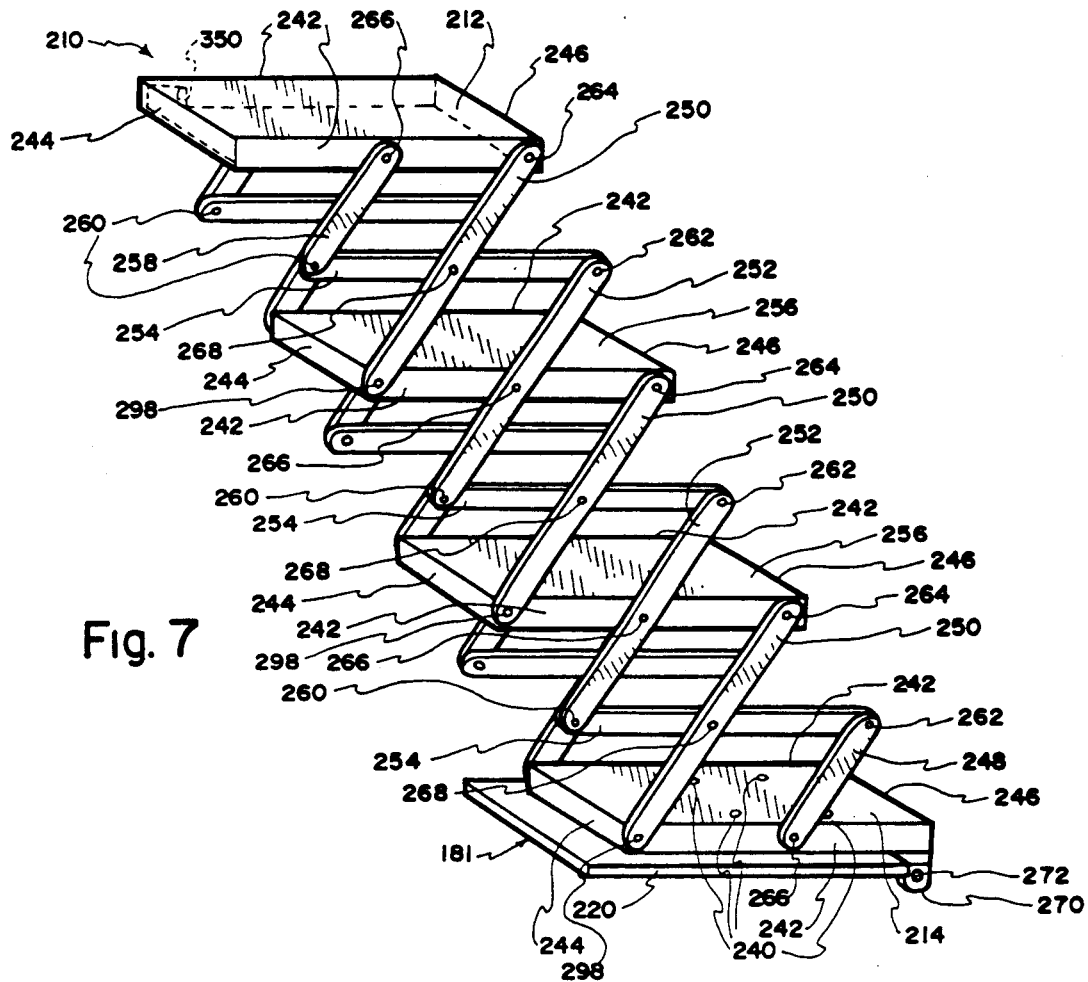
Fig. 7
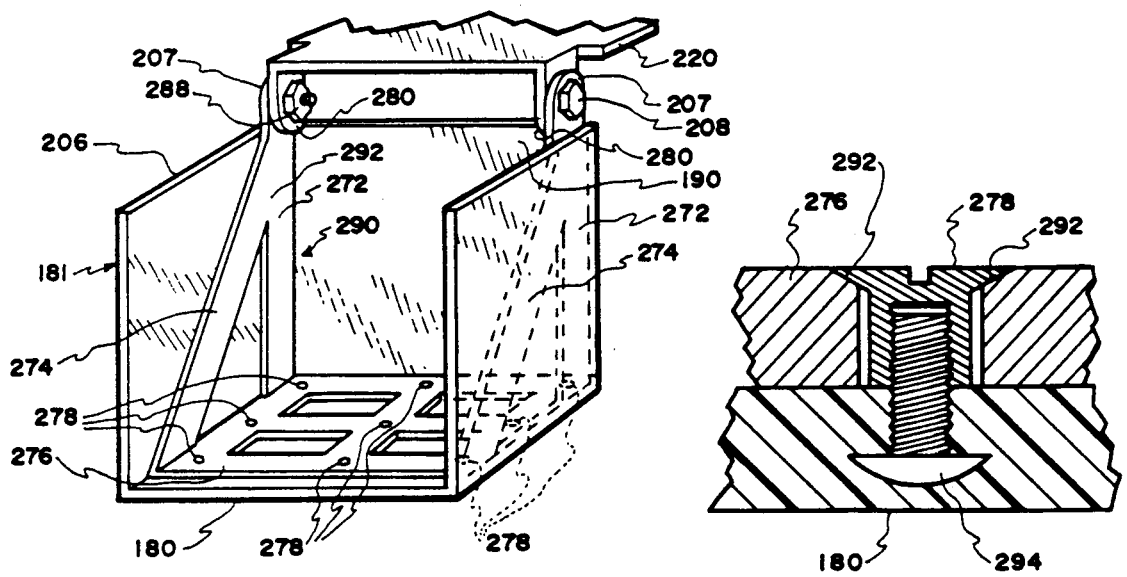
Fig. 8
Fig. 9

RETRACTABLE STAIRS FOR VEHICLES

FIELD OF INVENTION

This invention relates generally to retractable steps and more particularly to a novel vehicle carried, extendable-retractable staircase apparatus which provides safe and easy access to the top of a vehicle.

PRIOR ART

Most large vehicles comprising vans, recreational vehicles, trucks, and trailers provide a ladder for top access. It is a common practice to utilize the top of such vehicles for cargo, especially in the case of recreation vehicles and vans. However, ladders do not provide for safe and easy moving of heavy loads to and from the top of a vehicle. To safely ascend and descend a ladder, a person should use two hands, making simultaneous manual transportation of hand carried goods either impossible of unsafe.

Extendable-retractable stairs have been used for floor level entry into and exit from vehicles in the past. U.S. Pat. No. 4,623,160 provides a summary of related background art and discloses a retractable assembly of the type mentioned above. However, all of these are limited to ground-to-floor level access, i.e. providing stairs disposed strictly between the ground and the vehicle floor for easier access directly into or away from the vehicle. In all cases, the stairs are extended for use downward from a mounting site adjacent to the floor and outward from the vehicle and do not teach or suggest anything concerning access above floor level.

BRIEF SUMMARY AND OBJECTS OF THE INVENTION

In brief summary, this novel invention, in contrast to the known prior art, provides a safer and significantly more efficient access to the top of a vehicle. Luggage and other cargo can be carried with at least one free hand up an extensible/retractable tiered staircase. The staircase is displaced in directions parallel to the adjacent exposed surface of the vehicle providing access to the upper section of the vehicle along the length of the resulting stairway. One or more grab bars can be installed adjacent to the extended flight of stairs to assist the maintenance of balance.

In the retracted travel mode, the stairs are stored in a selectively closed container. In one presently preferred embodiment, the container, once opened, separates into two parts, so that the lower part forms a bottom step. The extendable-retractable staircase when extended is preferably releasibly secured to an adjacent stable part of the vehicle. For example, the top step can be stably releasibly secured to the vehicle when the staircase is so extended. Once attached, the stairway is ready for use.

The staircase is disconnected from the side of the vehicle and retracted into the container, following which the container parts are closed.

Accordingly, it is a primary object, for the purposes of accessing to the top of a vehicle, such as to load and unload cargo, to provide a novel extendable-retractable staircase apparatus.

It is a further important object to provide easier and safer access to the top of a vehicle than is provided by conventional vehicle ladders.

It is a further significant object to provide for affixation of an accordion staircase to the exterior of a vehicle such that they can be readily and safely used substantially between the floor level and a location well above the floor level of the vehicle.

It is an important object to provide a container for a retracted staircase for a vehicle whereby the staircase is securely enclosed and concealed for travel.

It is a further dominant object to provide a container for a retractable vehicle staircase which is comprised of at least two parts which may be selectively opened and closed.

It is a principal object to provide an openable container for a retractable vehicle staircase wherein at least part of the container functions as the lowest step of the staircase when the stairs are expanded for use.

It is a paramount object to provide a vehicle staircase which has extendable and retractable stairs and comprises at least one step which can be stably secured to adjacent vehicle structure when the staircase is extended.

It is a main object to provide for attaching an extending-retracting top access staircase to the exterior of a vehicle.

It is a paramount object to provide an extendable-retractable staircase which can be erected and retracted with one hand.

It is a further primary object to provide an extendable-retractable staircase for access to the top of a vehicle, which can be selectively and periodically erected and taken down.

It is a fundamental object to provide an extendable-retractable staircase which affords an ascension and descension path parallel to the vehicle.

It is a further significant object to provide an extendable-retractable staircase which can be used to access to the top of a vehicle such as a van, a camper, a recreation vehicle, a truck cab, a tanker, and a trailer without use of both hands.

It is a key object to provide an expandable-retractable staircase in combination with at least one safety grab bar mounted on the outside of the vehicle.

These and other objects and features of the present invention will be apparent from the detailed description taken with reference to accompanying drawings.

BRIEF DESCRIPTION OF THE DRAWINGS

FIG. 1 is a perspective drawing of a vehicle showing an enclosed, retracted, extendable-retractable stairs apparatus mounted on the right rear bumper of a vehicle;

FIG. 3 is a perspective drawing similar to that of FIG. 2, except the stairs are fully extended and coupled to a support means;

FIG. 5 is a perspective drawing of a spare tire assembly of a vehicle showing attachment of a stair support means;

FIG. 6 is a sectional drawing of a top step coupled to a stair support means;

FIG. 7 is a perspective view showing stairs details;

FIG. 8 is a perspective view showing bottom step details; and

FIG. 9 is a cross section through attaching flush mounted bolts showing attachment of cover to bottom step frame.

DETAILED DESCRIPTION OF THE ILLUSTRATED EMBODIMENT

Figure 2:
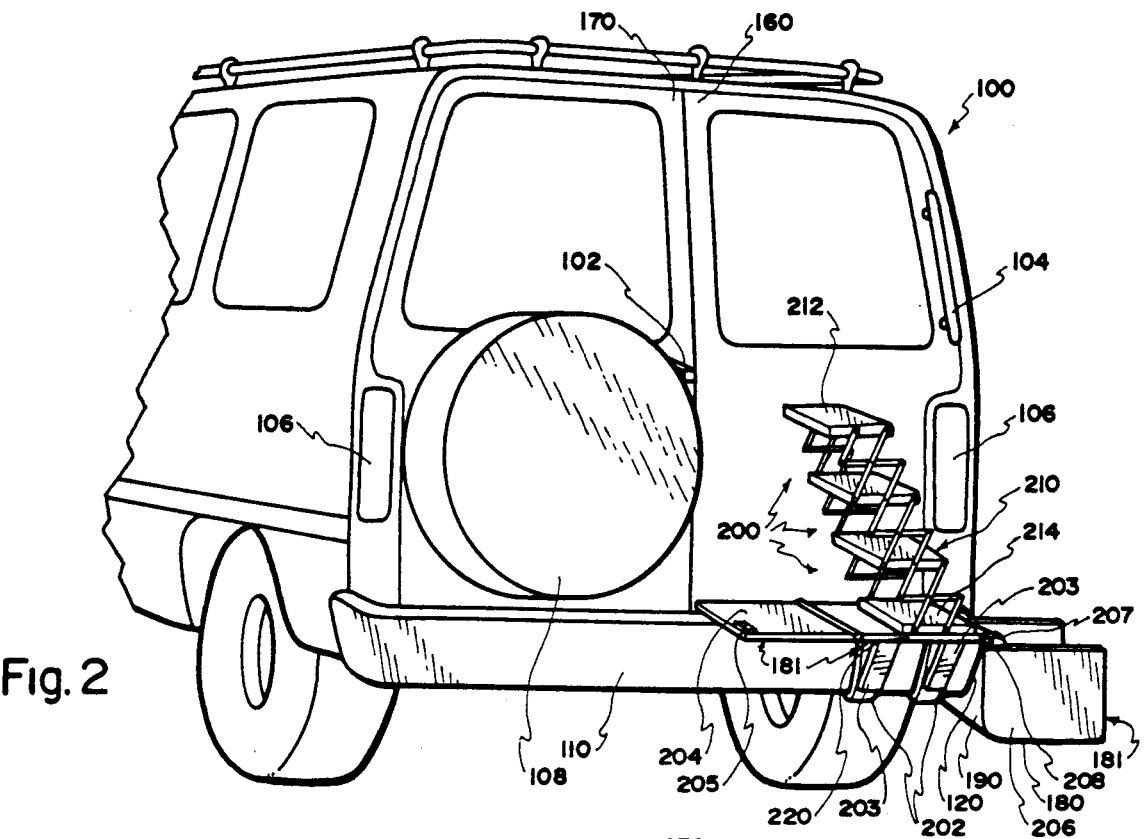
FIG. 2 is a perspective drawing similar to that of FIG. 1, except the apparatus cover has been separated revealing the stairs which are shown partially extended.
Figure 4:
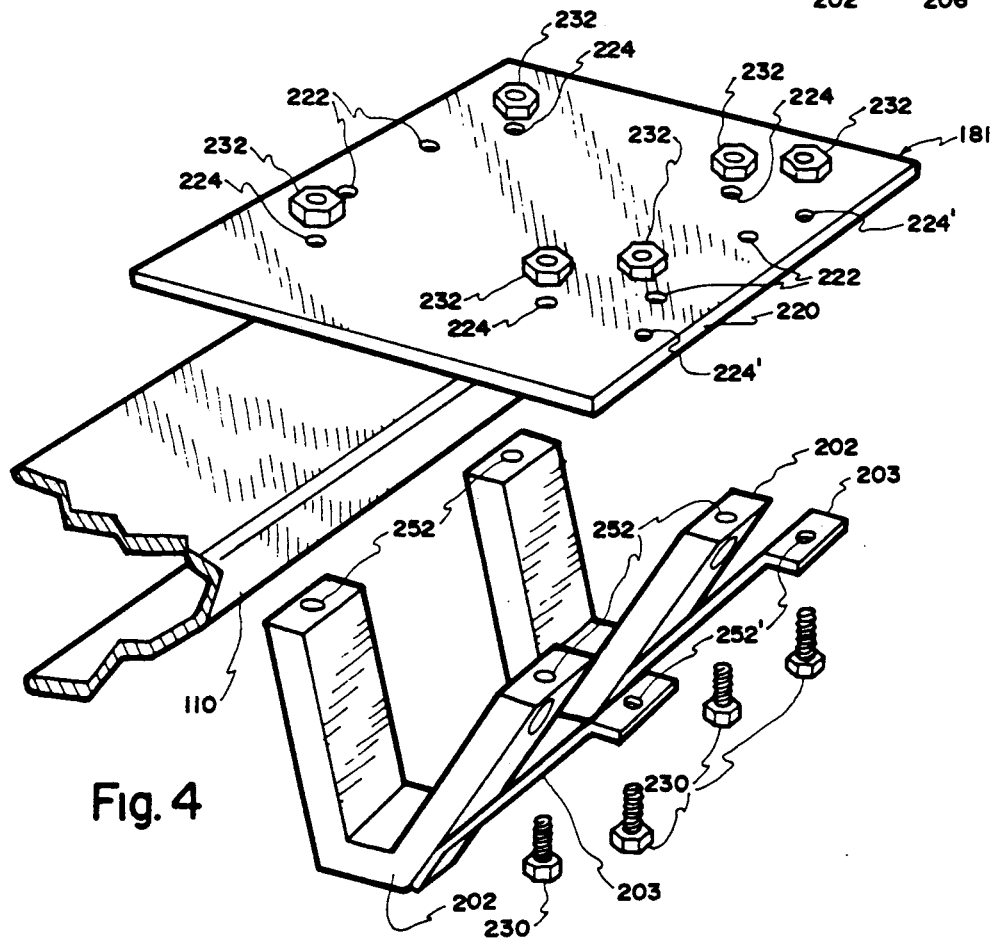
FIG. 4 is a schematic drawing showing a means for attaching a mounting plate to a bumper of a vehicle.

Reference is now made to the embodiment illustrated in FIGS. 1-7, wherein like numerals are used to designate like parts throughout. Referring to FIG. 1, which shows a rear view of a vehicle 100, illustrated as being in the form of a van, with the currently preferred embodiment of the expandable staircase apparatus 200 mounted above mounting plate 220 on the far right end of bumper 110. In this view, a staircase is enclosed within and concealed by a foldable container 181, providing a travel-ready assembly.

In this closed position, the staircase apparatus provides a sufficiently low profile that rear brake lights 106 are not concealed. Mounting brackets 202 and gusset braces 203, to be discussed in more detail later, do not significantly affect bumper-to-ground clearance. As will be discussed later, a conventional spare tire assembly 108 on left rear door 170 provides for securely affixing staircase anchor 102. A grab bar 104, adapted for single-hand use, is shown fastened to the right rear door frame 160 of van 100.

FIG. 2 shows the container 181 of the staircase 210 unfolded into the "open" position. The components of the container 181 are preferably made of fiber glass reinforced synthetic resinous material. One side wall 204 of the container 181 is hinged for rotation being the closed vertical position of FIG. 1 and the horizontal open position of FIGS. 2 and 3. The container 181 is anchored upon bumper 110 in such a way that clearance exists through which staircase 210 may rise.

Another container part 206, comprising three side walls and a top wall, is pivotally connected to mounting plate 220 at each of the two lower right corners of the container 181. Container component 206 at the top wall 180 becomes the bottom step after being rotated about hinge bolts 208 until interior of the top wall 180 becomes the lowest step. In that position, side wall 190 of container part 206 comes to rest against the right end of bumper 110 at site 120, which provides a rotational limit or stop and, thereby, assures bottom step stability.

As shown in FIG. 8, on each side of container part 206, each bolt 208 passes through a hole in the associated flange 207 and a hole in the associated lug 209 of mounting plate 220 to thereby pivotally affix part 206 to plate 220. Flange 207 is an integral part of cover frame 290, which comprises opposed vertical support members 272, opposed diagonal support members 274, and frame step member 276. All members of frame 290 are preferably formed from 1×⅛ inch steel bar and are permanently welded together. When rotated downward into the "step" position, each vertical support member 272 descends vertically from cover flange 207 to orthogonally attach to frame step member 276 along horizontal line 294. Each diagonal support member 274 extends outward and downward from vertical attachment line 292 where vertical support member 272 attaches to diagonal support member 274 to line 294 where diagonal support member 274 orthogonally attaches to frame step member 276 to form the complete step cover frame 290.

Cover frame 290 is attached to component 206 by flush mounted countersink bolts 278. As shown in FIG. 9, screws 294 are preferably partially molded into the wall 180. Each screw 294 is positioned to extend axially into one of the holes 292 in frame step member 276 such that a flush mounted nut 278 can be placed and tightened on the exposed threads of each screw 294 to affix cover 180 tightly to frame step member 276.

Opening the container 181 exposes mounting base plate 220 of the container and accordion stairs 210 to view. An enlarged view of mounting base plate 220 is provided in FIG. 4. Mounting base plate 220 is attached to bumper 110 using two "U" brackets 202 and associated bolts 230 and locknuts 232. Bolts 230 are upwardly directed through holes 252 in "U" bracket 202 extremities and through holes 224 in mounting base plate 220 and tightly affixed by locknuts 232. Before the mounting base plate 220 and "U" brackets 202 are secured, the stairs apparatus is positioned at the far right end of bumper 110 such that side 190 of cover part 206 will rotate and contact bumper 110 as described earlier.

Mounting base plate 220 is cantilevered rearward from bumper 110 to form a mounting base for bottom step 214 of stairs 210. Gusset braces 203 are welded to mounting brackets 202 and bolted to the rearward section of mounting plate 220 to add stability to mounting plate 220 outward from bumper 110. Gusset brace 203 attachment to mounting base plate 220 is accomplished using bolts 230 upwardly directed through holes 252' in the gusset braces 203 extremities and through holes 224 in mounting base plate 220 and tightly affixing locknuts 232. Bottom step 214 of stairs 210 is bolted to mounting base plate 220 using mounting holes 222 to form the plane from which stairs 210 will extend.

Stairs 210 are shown in greater detail in FIG. 7. Each step comprises a back 244, front 246, and two sides 242. All steps are illustrated as being of uniform thickness and shape and are of substantially the same size. The steps are preferably made of heavy gauge aluminum and are connected on each side by two identical aluminum bar linkages or scissor frame members which pivot at each central and end connecting points such that the stairs can fold together into a compact collapsed arrangement, each higher step resting contiguously on and juxtaposed above the next lower step. In the FIGS., parts which are identical on both sides 242 of stairs 210 are not numbered on the side away from the viewer to reduce the complexity of the drawing for clarity of presentation. With the exception of top step 212, all steps are connected to each next higher step by the aluminum bar linkages extending from sides 242.

Bottom step 214 is affixed to mounting plate 220 with countersunk mounting bolts 240. The aluminum linkages comprise diagonal rising members 248, 250, 252, and 258 and horizontal members 254. The lengths of diagonal rising members 248 and 258 are substantially shorter than the other diagonal rising members because there is no step below bottom step 214 or above top step 212 to which connection is required.

On each side, bottom step 214 supports next higher step 256 pivotally through linkage end connections 266 and 298 of vertically rising members 248 and 250, respectively. Pivotal connecting points 266, 298, 262, and 268 are positioned on bottom step 214 and the horizontal member and rising members such that a parallelogram is formed among the connecting linkage means and the bottom step, with the bottom step forming the base of the parallelogram. Pivotal connecting points 260, 268, 264, and 266 are positioned on next higher step 256 and the horizontal and rising members such that a parallelogram is formed among the connecting linkage means and the next higher step, with the next higher step forming the top of the parallelogram.

The higher end of rising member 248 is pivotally connected to the forward end 262 of horizontal member 254 at pivot point 262. At linkage center point 268, horizontal member 254 pivotally connects to rising member 250. Rising member 250 continues above horizontal member 254 to pivotally connect at pivot point 264 to the forward end of next higher step 256. At rearward end pivot point 260, horizontal linkage 254 connects to rising member 252. At pivot point 266, rising member 252 connects medially, forming an "X" with next higher step 256 to complete the support from bottom step 214 to next higher step 256.

Each step connects to its next higher step in the manner described for the bottom step, except rising member 252 extends from the medial pivot point 266 rather than shorter rising member 248. In the case of the top step, shorter rising member 258 connects pivotal points 260 and 266 in the place of longer member 252 because no support is required to a higher step. The parallelogram form of the aluminum linkage support maintains the steps in the same plane as the bottom step as stairs 210 are extended and retracted. Thus, the steps are parallel with the plane of the bumper and mounting plate when stairs 210 are extended and coupled into position for use. In the illustrated embodiment, stairs 210 comprise four steps.

As shown in FIGS. 2-3 stairs 210 extend diagonally (upward and laterally), generally parallel with the rear door 160 of van 100. Top step 212 is raised until it is just above support 102. In the illustrated embodiment, support 102 may comprise a ½ × ½ inch square steel bar 102 welded to mounting bar 332 for the spare tire 108, best seen in FIG. 5. Mounting bar 332 is permanently affixed to van 100 through standard mounting plate assemblies 330 providing sturdy support for spare tire 108 and steel bar 102. Steel bar 102 is welded to mounting bar 332 along common area 344. From area 344 steel bar 102 segment 348 extends laterally between rear door 170 and spare tire 108 to a point 342 beyond the rim of tire 108 where it is bent outward 90 degrees from rear door 170 to form attachment and support segment 346.

Final load transferring relationship is made between top step 212 and support segment 346 of steel bar 102, as shown in FIG. 6. Top step 212 attachment structure 350, formed by cutting a notch out of the inward side flange of top step 212, is manually placed over the cantilevered support segment 346 to restrainingly and stably fix the height and lateral position of stairs 210, completing extension of the collapsible staircase for use.

To return the stairs to the travel mode, the process is reversed. Top step 212 is manually raised to free attachment means 350 from support segment 346 then moved to the right laterally. Once free of support segment 346, stairs 210 manually retract to the collapsed position where each step is contiguously juxtaposed one above the other and above bottom step 214. Container parts 204 and 206 are reverse rotated to their upright closed position and latched, thereby concealing the stairs. See FIG. 1. In the illustrated embodiment, the latch may comprise magnetic latch 205. See FIG. 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A retractable/extensible staircase apparatus for access to at least one elevated site at the exterior and materially above a floor of a vehicle, the staircase apparatus comprising:
    means by which the staircase apparatus is mounted to the exterior of a vehicle;
    staircase means comprising a series of steps disposed above the mount means and collapsible/extensible frame means interconnecting the steps;
    the staircase means further comprising means by which the staircase means are securely supported at the exterior of the vehicle when extended and elevated to provide access to at least one location exteriorly disposed substantially above the floor;
    container means into which the staircase means are collapsed during periods of nonuse including travel and storage.

2. A retractable/extensible staircase apparatus for access to at least one elevated site at the exterior and materially above a floor of a vehicle, the staircase apparatus comprising:
    means by which the staircase apparatus is mounted to the exterior of a vehicle;
    staircase means comprising a series of steps disposed above the mount means and collapsible/extensible frame means interconnecting the steps;
    the staircase means further comprising means by which the staircase means are securely supported at the exterior of the vehicle when extended and elevated to provide access to at least one location exteriorly disposed substantially above the floor;
    container means and means by which the container means are opened to extend the staircase means and closed to conceal the collapsed staircase means.

3. A retractable/extensible staircase apparatus for access to at least one elevated site at the exterior and materially above a floor of a vehicle, the staircase apparatus comprising:
    means by which the staircase apparatus is mounted to the exterior of a vehicle;
    staircase means comprising a series of steps disposed above the mount means and collapsible/extensible frame means interconnecting the steps;
    the staircase means further comprising means by which the staircase means are securely supported at the exterior of the vehicle when extended and elevated to provide access to at least one location exteriorly disposed substantially above the floor;
    said means by which the staircase apparatus is mounted to the exterior of the vehicle comprising bracket means comprising platform means fastened to vehicle bumper means to comprise one step of the apparatus.

4. A retractable/extensible staircase apparatus for access to at least one elevated site at the exterior of a vehicle, the staircase apparatus comprising:
    means by which the staircase apparatus is mounted to the exterior of a vehicle, said mount means comprising bracket means comprising platform means fastened to vehicle bumper means to comprise one step of the apparatus;
    staircase means comprising a series of steps disposed above the mount means and collapsible/extensible frame means interconnecting the steps;

the staircase means further comprising means by which the staircase means are securely supported at the exterior of the vehicle when extended;

said platform means being pivotally attached to at least part of container means for receiving the staircase means when collapsed.

5. A staircase apparatus according to claim 4 wherein at least part of the container means comprise one step of the apparatus when pivoted to an open condition.

6. A retractable/extensible staircase apparatus for access to at least one elevated site at the exterior of a vehicle, the staircase apparatus comprising:

means by which the staircase apparatus is mounted to the exterior of a vehicle;

staircase means comprising a series of steps disposed above the mount means and collapsible/extensible frame means interconnecting the steps;

the staircase means further comprising means by which the staircase means are securely supported at the exterior of the vehicle when extended;

container means comprising at least two parts comprising first means comprising crown means of the container means when closed which becomes step means when unfolded to an open position.

7. A staircase apparatus according to claim 6 wherein said parts of the containers are releasibly held together by container fastening means when in the closed position.

8. In combination:

a vehicle comprising floor means, first and second exterior staircase support means disposed respectively at a relatively high elevation materially above the floor means and a relatively low elevation;

collapsible/extensible step means carried solely by the second support means at the exterior of the vehicle when the step means are collapsed and carried jointly by the first and second support means when the step means are extended to span substantially above the floor means;

the first exterior staircase support being both vertically substantially above and horizontally substantially offset from the second exterior support whereby the step means are diagonally elevated to the extended position immediately adjacent to the surface of the vehicle.

9. In combination:

a vehicle comprising floor means, first and second exterior staircase support means disposed respectively at a relatively high elevation materially above the floor means and a relatively low elevation;

collapsible/extensible step means carried solely by the second support means at the exterior of the vehicle when the step means are collapsed and carried jointly by the first and second support means when the step means are extended to span substantially above the floor means;

container means into which the step means are collapsed during periods of nonuse including travel and storage.

10. In combination:

a vehicle comprising floor means, first and second exterior staircase support means disposed respectively at a relatively high elevation, materially above the floor means and a relatively low elevation;

collapsible/extensible step means carried solely by the second support means at the exterior of the vehicle when said step means are collapsed and carried jointly by said first and second support means when said step means are upwardly extended to span substantially above the floor means;

container means into which the step means are collapsed during period of nonuse including travel and storage;

the container means comprising pivot means by which at least part of the container is inverted to comprise a step disposed below the second exterior support means.

11. A vehicle comprising an undercarriage and adjacently mounted extendable-retractable stairs means comprising:

mounting plate means carried by the vehicle upon which the stairs means are mounted and carried by the vehicle;

releasible fastened cover means comprising at least two parts pivotally attached to the mounting plate means;

one part of said cover means which opens downward to form a lowest step for the stairs means;

said extendable-retractable stairs means comprising a series of steps including at least an uppermost step and second lowest step;

the second lowest step being affixed at the level of said mounting plate means;

all steps above the second lowest step extendable vertically and laterally along a path parallel to the adjacent side of the vehicle from a retracted position juxtaposed the second lowest step;

support means to which the uppermost step can be coupled;

said stairs means when coupled in extended position to the support means providing sidewise access to the top of the vehicle.

12. A method for providing for more easily and safely ascending and descending the exterior of a vehicle above a floor level thereof comprising the following steps:

providing a covered retractable stairs means semipermanently affixed to the vehicle;

opening means for cover means of said retractable stairs means such that one part of said cover means from a bottom step for said stairs means;

unfolding the retractable stairs upwards;

coupling the top step means of said stairs means to a support means materially above the floor level to provide a series of steps upward from the ground providing access to the top of the vehicle.

13. A method for providing for more easily and safely ascending and descending the exterior of a vehicle comprising the following steps:

providing a covered retractable stairs means semipermanently affixed to the vehicle;

opening cover means of said retractable stairs means such that one part of said cover means form a bottom step for said stairs means;

unfolding the retractable stairs means upwards;

coupling the top step means of said stairs means to a support means to provide a series of steps upward from the ground providing access to the top of the vehicle;

uncoupling the top step of said stairs means from the support means, retracting the stairs means, closing the cover means and releasibly fastening the cover parts together for travel.

14. A method for providing for more easily and safely ascending and descending the exterior of a vehicle comprising the following steps providing a covered retractable stairs means semi permanently affixed to the vehicle;

opening cover means of said retractable stair means such that one part of said cover means form a bottom step for said stairs means;

unfolding the retractable stairs means upwards so that the stairs means are displaced generally parallel to the exterior of the vehicle;

coupling the top step means of said stairs means to a support means to provide a series of steps upward from the ground providing access to the top of the vehicle.

15. A method according to claim 12 comprising the step of mounting the stairs means on the rear of the vehicle and causing the displacement path of said stairs to be parallel to the rear of the vehicle.

* * * * *